Sept. 26, 1933.  A. H. TINNERMAN  1,928,469
FASTENING STRIP
Filed April 17, 1933

Inventor
Albert H. Tinnerman
By Bates, Goldrick & Teare
Attorneys

Patented Sept. 26, 1933

1,928,469

UNITED STATES PATENT OFFICE 1,928,469

FASTENING STRIP

Albert H. Tinnerman, Cleveland, Ohio

Application April 17, 1933. Serial No. 666,430

2 Claims. (Cl. 85—36)

This invention relates to spring fasteners, and particularly to a spring nut, which can be conveniently positioned on a bolt merely by a longitudinal movement of the bolt through the fastener. Spring nuts of this character have heretofore been made, and have comprised a base portion from which two thread engaging prongs have been struck upwardly. The base portion however, has been arched upwardly with the intention of providing additional resiliency, and of increasing the holding power of the nut on a bolt. I have found that the arching of the base has made it necessary to perform the required heat treating operation after the stamping operation, for the base could not be arched after it was heat treated. As the fasteners are necessarily small in size, and as collective handling of them in a basket is impractical, it has been necessary to heat treat them by passing them on a conveyor through a furnace. The collective handling is unsatisfactory for if one fastener is covered by another, it will not be subjected to the same degree of heat, and therefore, the batch will not possess uniform resiliency.

An object of the present invention therefore, is to make a spring nut, which can be handled in coil form through the heat treating operation, and thereafter, through the forming operation, thus reducing, by approximately one-half, the cost of production.

A further object is to so form a fastener that the thread engaging prongs will possess considerably more strength than they would if they were merely stamped from the body portion.

Figure 1:
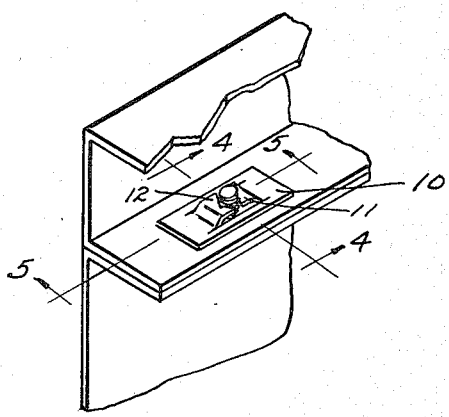
Figure 2:
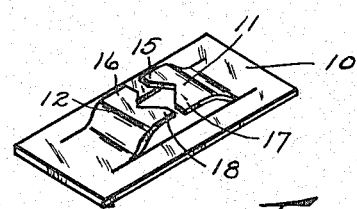
Figure 3:
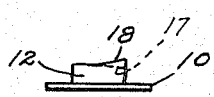
Figure 4:
Figure 5:
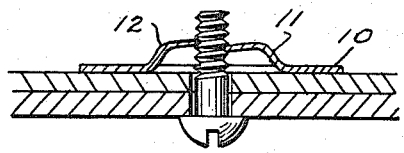
Figures 6, 7:
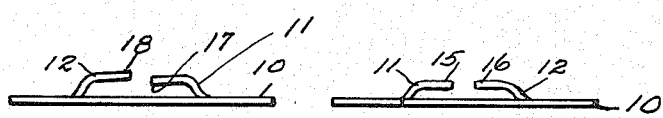
Figure 8:
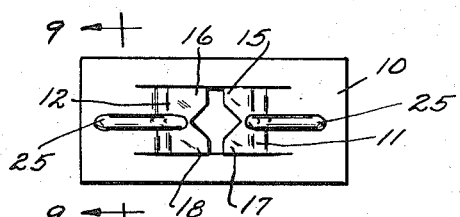
Figure 9:
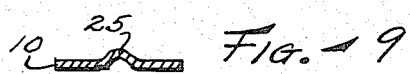

The spring fastener, which I have devised is adapted for use in holding any two articles together, such as heretofore been accomplished by means of a threaded nut, so in the drawing I have illustrated two plates which are intended to be fastened together with my device. To this end, Fig. 1 is a perspective view showing two articles that are clamped together with a fastener made in accordance with my invention; Fig. 2 is also a perspective view of a fastener on an enlarged scale; Fig. 3 is an end view of the fastener; Fig. 4 is a section taken on the line 4—4 in Fig. 1; Fig. 5 is a section taken on the line 5—5 in Fig. 1; Figs. 6 and 7 are side elevations of the fastener, on an enlarged scale, taken from different sides of it; Fig. 8 is a top plan view of a fastener showing a modification thereof, and Fig. 9 is a section taken on the line 9—9 in Fig. 8.

The spring fastener, which I have devised has a base portion 10 which comprises a flat strip of sheet metal from which oppositely disposed prongs 11 and 12 are struck upwardly. The prongs have in general, an arched formation with respect to the base, such as a substantially ogee formation and such formation is obtained preferably by inclining the prongs upwardly, and then downwardly so that the bolt engaging portions lie substantially normal to the axis of a bolt. In addition, the inner ends of the prongs are sloped laterally to conform to the helical shape of a thread. This results in a vertical displacement of some of the corners with reference to the base portion, and insures coordination between the prongs and the thread of a bolt during the locking operation. For example the corner prongs 15 and 16 are shown, as being substantially at the same height above the base, while prongs 17 and 18 are shown at different elevations, which difference corresponds to the pitch distance of the thread with which the nut is intended for use.

The use of a flat base, together with the illustrated arched formation of the prongs, makes the fastener particularly well suited for manufacture on a production basis directly from a coil of sheet metal stock in ribbon form. Heretofore, the arching of the base required the prong formation prior to the heat treating operation. The present fastener however, can be subjected to a heat treating process and then formed, for the prongs can be struck upwardly and be made to retain their desired shape because of the fact that they represent only a small part of the body portion.

A very important advantage flowing from the heat treatment prior to the forming operation is the fact that the material is handled in coil form and that it can therefore be subjected to a lead bath, rather than to the heat of a furnace. Thus, the two heating and quenching operations can be performed continuously and progressively merely by passing the strip into and out of the baths. Thereafter, the strip is formed and cut into individual nuts.

A modification of my invention is shown wherein each prong has a rib 25 which extends preferably in a longitudinal direction of the prong and which terminates short of the inner edge of the prong, and short of the end of the body portion. This slight corrugation has materially increased the resistance of the prong to collapse, and has thereby increased the efficiency of the fastener.

By means of my invention, I can reduce the number of operations that had to be performed, and I can thereby materially lower the manufacturing cost. Under the previous method, the strip material had to be annealed prior to the forming operation, whereas under the present arrangement, the annealing operation is not required. In addition thereto, the formed articles had to be handled each time they were put into or taken from a furnace and quenching bath, and finally had to be tumbled to remove scale. Under the present arrangement however, no handling is required during the heat treating process and the tumbling step is eliminated. The net result of these advantages are gained solely from the modification in shape of the fastener.

I claim:

1. A spring nut having a flat base portion and a pair of tongues struck upwardly therefrom, there being a corrugation in each tongue extending lengthwise thereof and terminating adjacent the base.

2. A spring nut, comprising a rectangular strip of sheet metal stock having a base comprising end portions that are connected by bridge portions, there being a pair of resilient arched tongues each consisting of a portion substantially parallel to the base and connected by a substantially ogee portion to an end portion and between the bridge portions, each tongue having a width that is substantially equal to the distance between the bridge portions for the entire length thereof and having a re-entrant recess, and the two recesses cooperating to admit a bolt, and to substantially surround the bolt, the opposing corners of the tongues being tilted so as to conform with the generation of a thread on the bolt with which the nut is intended to be used, and the bridge portions and end portions lying substantially in a common plane.

ALBERT H. TINNERMAN.